US008220982B2

(12) United States Patent
Musil

(10) Patent No.: US 8,220,982 B2
(45) Date of Patent: Jul. 17, 2012

(54) ENERGY EFFICIENT ASPHALT PLANT

(75) Inventor: Joseph E. Musil, Ely, IA (US)

(73) Assignee: Terex USA, LLCDE (US)

( * ) Notice: Subject to any disclaimer, the term of this patent is extended or adjusted under 35 U.S.C. 154(b) by 425 days.

(21) Appl. No.: 12/504,464

(22) Filed: Jul. 16, 2009

(65) Prior Publication Data

US 2010/0020630 A1    Jan. 28, 2010

Related U.S. Application Data

(60) Provisional application No. 61/082,555, filed on Jul. 22, 2008.

(51) Int. Cl.
*B28C 5/20* (2006.01)
*B28C 5/46* (2006.01)

(52) U.S. Cl. .......................... 366/23; 366/25

(58) Field of Classification Search ........... 366/7, 22–25
See application file for complete search history.

(56) References Cited

U.S. PATENT DOCUMENTS

| | | | |
|---|---|---|---|
| 152,710 A * | 6/1874 | Walker | 366/23 |
| 663,999 A | 12/1900 | McKelvey | |
| 1,009,225 A | 11/1911 | Cummer | |
| 1,240,481 A | 9/1917 | Popkess | |
| 1,462,851 A | 7/1923 | Cooper | |
| 2,421,345 A | 5/1947 | McConnaughay | |
| 2,644,379 A | 7/1953 | Lowe | |
| 2,721,730 A * | 10/1955 | Clause et al. | 165/88 |
| 2,805,052 A | 9/1957 | Preeman | |
| 3,285,147 A | 11/1966 | Gruvris | |
| 3,540,709 A | 11/1970 | Fisher | |
| 3,905,587 A | 9/1975 | Preeman | |
| 3,999,743 A | 12/1976 | Mendenhall | |
| 4,011,023 A | 3/1977 | Cutler | |
| 4,089,508 A | 5/1978 | Anderson | |
| 4,103,350 A | 7/1978 | Brock et al. | |
| 4,130,364 A | 12/1978 | Brown | |
| 4,245,915 A | 1/1981 | Bracegirdle | |
| 4,298,287 A | 11/1981 | McCarter et al. | |
| 4,354,826 A | 10/1982 | Kruger et al. | |
| 4,361,406 A | 11/1982 | Loggins et al. | |
| 4,378,162 A | 3/1983 | Bracegirdle | |
| 4,379,653 A | 4/1983 | Brown | |
| 4,395,129 A | 7/1983 | Musil | |
| 4,422,848 A | 12/1983 | Musil | |
| 4,557,626 A | 12/1985 | McKay et al. | |
| 4,585,354 A | 4/1986 | Thesenfitz | |
| RE32,206 E | 7/1986 | Bracegirdle | |
| 4,745,869 A | 5/1988 | Dilmore et al. | |
| 4,784,216 A | 11/1988 | Bracegirdle | |
| 4,787,938 A | 11/1988 | Hawkins | |
| 4,797,002 A | 1/1989 | Heap | |
| 4,812,076 A | 3/1989 | Yant | |

(Continued)

FOREIGN PATENT DOCUMENTS

EP    15200 A1    9/1980

(Continued)

*Primary Examiner* — David Sorkin

(74) *Attorney, Agent, or Firm* — Simmons Perrine Moyer Bergman PLC

(57) ABSTRACT

An HMA plant which uses incidental heating of metal surfaces in combination with hot exhaust gases to pre-heat and pre-dry virgin aggregate material contained in an enclosed container which permits hot dry air to pass through interstices in the virgin aggregate material stored in the container.

3 Claims, 2 Drawing Sheets

U.S. PATENT DOCUMENTS

| | | |
|---|---|---|
| 4,818,139 A | 4/1989 | Brock et al. |
| 4,867,572 A | 9/1989 | Brock et al. |
| 4,910,540 A | 3/1990 | Murray |
| 4,913,552 A | 4/1990 | Bracegirdle |
| 4,928,890 A | 5/1990 | Swisher, Jr. |
| 4,932,785 A | 6/1990 | Bracegirdle |
| 4,946,283 A | 8/1990 | Musil |
| 4,948,261 A | 8/1990 | Marconnet |
| 4,955,722 A | 9/1990 | Marconnet |
| 5,000,615 A | 3/1991 | Murray |
| 5,015,120 A | 5/1991 | Brock et al. |
| 5,052,810 A | 10/1991 | Brock |
| 5,083,870 A | 1/1992 | Sindelar et al. |
| 5,100,277 A | 3/1992 | Musil |
| 5,197,848 A | 3/1993 | Musil |
| 5,201,839 A * | 4/1993 | Swisher, Jr. .................. 366/4 |
| 5,203,693 A | 4/1993 | Swanson |
| 5,251,976 A | 10/1993 | Milstead |
| 5,261,738 A | 11/1993 | Brock |
| 5,273,355 A | 12/1993 | May et al. |
| 5,291,876 A | 3/1994 | Milstead |
| 5,295,821 A | 3/1994 | Daukss |
| 5,312,246 A | 5/1994 | Brock |
| 5,320,426 A | 6/1994 | Keylon et al. |
| 5,334,012 A | 8/1994 | Brock et al. |
| 5,356,238 A | 10/1994 | Musil et al. |
| 5,364,182 A | 11/1994 | Hawkins |
| 5,378,060 A | 1/1995 | Brock et al. |
| 5,380,084 A | 1/1995 | Milstead |
| 5,405,214 A | 4/1995 | Campbell |
| 5,455,005 A | 10/1995 | Clawson |
| 5,478,530 A | 12/1995 | Swanson |
| 5,522,158 A | 6/1996 | Swanson |
| 5,538,340 A | 7/1996 | Brashears |
| 5,551,166 A | 9/1996 | Milstead |
| 5,573,396 A | 11/1996 | Swanson |
| 5,615,973 A | 4/1997 | Campbell |
| 5,664,881 A | 9/1997 | Hawkins et al. |
| 5,851,085 A | 12/1998 | Campbell |
| 5,857,804 A | 1/1999 | Musil |
| 5,868,522 A | 2/1999 | Campbell |
| 5,873,653 A | 2/1999 | Paetzold |
| 5,882,592 A | 3/1999 | Bracegirdle |
| 5,899,630 A | 5/1999 | Brock |
| 5,988,864 A | 11/1999 | Bracegirdle |
| 5,988,935 A | 11/1999 | Dillingham |
| 6,007,272 A | 12/1999 | Macku |
| 6,019,544 A | 2/2000 | Emerson et al. |
| 6,071,040 A | 6/2000 | Macku et al. |
| 6,099,205 A | 8/2000 | Macku et al. |
| 6,109,826 A | 8/2000 | Mertes |
| 6,299,380 B1 | 10/2001 | Bracegirdle |
| 6,318,928 B1 | 11/2001 | Swearingen |
| 6,340,240 B1 | 1/2002 | Swisher, Jr. et al. |
| 6,371,689 B1 | 4/2002 | Wiley |
| 6,560,817 B2 | 5/2003 | Deitermane et al. |
| 6,652,268 B1 | 11/2003 | Irwin et al. |
| 6,672,751 B2 | 1/2004 | Hawkins |
| 6,855,440 B2 | 2/2005 | Bracegirdle |
| 6,971,784 B1 | 12/2005 | Bracegirdle |
| 2003/0227815 A1 | 12/2003 | Dillman |
| 2004/0240939 A1 | 12/2004 | Hays et al. |
| 2005/0073905 A1 | 4/2005 | Montgomery et al. |
| 2006/0083104 A1 | 4/2006 | Montgomery et al. |

FOREIGN PATENT DOCUMENTS

| | | |
|---|---|---|
| JP | 02016203 A | 1/1990 |
| JP | 02112506 A | 4/1990 |

* cited by examiner

ENERGY EFFICIENT ASPHALT PLANT

CROSS REFERENCE TO RELATED APPLICATIONS

This application claims the benefit of the filing date of provisional patent application entitled "Pre-Aggregate Dry Energy Efficient Asphalt Plant", having Ser. No. 61/082,555, which was filed on Jul. 22, 2008, by Joseph E. Musil, which provisional patent application is incorporated herein in its entirety by this reference. This application is related to U.S. patent application Ser. No. 12/138,204 entitled "Low Emission Energy Efficient 100 Percent Rap Capable Asphalt Plant" filed on Jun. 12, 2008, by the same inventor and assigned to the same assignee. This application is incorporated by reference herein in its entirety by this reference.

FIELD OF THE INVENTION

The present invention generally relates to hot mix asphalt (HMA) plants used in road paving.

BACKGROUND OF THE INVENTION

In recent years, attempts have been made to improve the efficiency of hot mix asphalt (HMA) plants. Conventional direct-fired prior art drum hot mix asphalt plants often utilize a mixture of virgin aggregate material and recycled asphalt products (RAP). This virgin aggregate is generally stockpiled until it is needed. It is often exposed to the atmosphere and to rain, snow, etc. The moisture content of virgin aggregate can vary, but it is often not insignificant. As a constituent of HMA, the virgin aggregate is necessarily heated far above the boiling point of water during the asphalt production process. This heating across the vaporization point (which also dries the virgin aggregate) consumes a large amount of energy. Much of the total energy supplied to a drum heater in an asphalt plant is consumed in heating and drying the constituents of HMA, including virgin aggregate material.

Consequently, there exists a need for improved methods and systems for cost effectively heating and drying virgin aggregate material used in asphalt production.

SUMMARY OF THE INVENTION

It is an object of the present invention to provide a system and method for producing asphalt in an efficient manner.

It is a feature of the present invention to utilize a virgin aggregate feed bin with an integrated dryer.

It is another feature of the present invention to use atmospheric or heated air to pre-dry/heat virgin aggregate material.

It is another feature of the present invention to include capturing exhaust and other wasted heat from various portions of an asphalt plant and using it to dry and pre-heat virgin material.

It is another feature of the present invention to use a heat exchanger to convert humid exhaust air to heat air to dry virgin aggregate material.

It is yet another feature of the present invention to reduce the emission of gaseous and liquid sulfuric and other acids by maintaining separation between exhaust gases used to heat the HMA to a point above the boiling point of water and moisture given off by the HMA mixture when it is heated above the boiling point of water, while both are used separately to heat the air used to heat the virgin aggregate.

It is an advantage of the present invention to provide a relatively high efficiency HMA plant.

The present invention is designed to satisfy the aforementioned needs, provide the previously stated objects, include the above-listed features, and achieve the already articulated advantages.

Accordingly, the present invention is an asphalt plant comprising:
 an asphalt mixer;
 a supply of aggregate material;
 a structure constructed for enclosing and containing aggregate material and protecting said aggregate material from precipitation and further comprising components configured to allow air to flow through the aggregate material for the purpose of drying said aggregate material with at least one of atmospheric air and artificially heated and propelled atmospheric air; and
 a conveyor to move said aggregate material from said structure into said asphalt mixer.

The present invention is also a method of making hot mix asphalt comprising the steps of:
 providing an asphalt mixer;
 providing a supply of aggregate material;
 providing a structure configured for enclosing and containing aggregate material in a substantially stationary arrangement and protecting said aggregate material from precipitation and further causing air to flow through the aggregate material for the purpose of drying said aggregate material with artificially heated and propelled atmospheric air; and
 causing said aggregate material to move from said structure into said asphalt mixer.

The present invention is further an asphalt plant comprising:
 means for reclaiming heat from a heated metal object and using reclaimed heat for artificially heating air which is propelled into the structure and blown through interstices in the aggregate material.

BRIEF DESCRIPTION OF THE DRAWINGS

The invention may be more fully understood by reading the following description of the preferred embodiments of the invention, in conjunction with the appended drawings wherein.

DETAILED DESCRIPTION OF THE INVENTION

Figure 1:
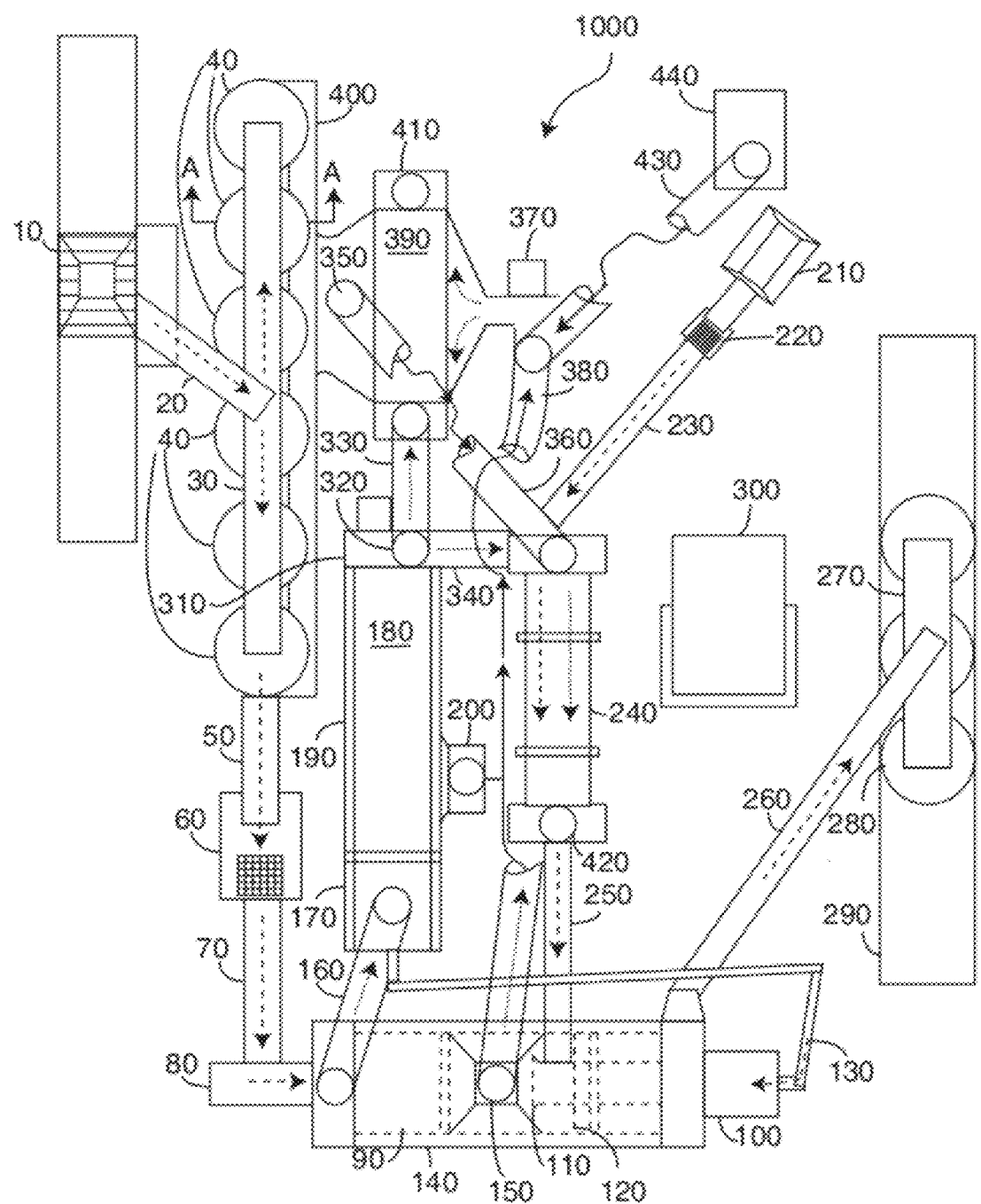
FIG. 1 is a plan view of an HMA plant of the present invention where the long dashed line arrow represents direction of flow of various bulk materials through the plant. The dotted lines represent flow of gaseous matter with suspended small particulate matter. The solid arrowed lines represent a connection between portions of a pipe, etc. which is not drawn to reduce potentially confusing clutter in the drawings. The double-arrowed line A-A is a line along which the cross-sectional view of FIG. 2 was taken. The intermittent lines without arrowheads show otherwise hidden internal components.

Now referring to the drawings, wherein like numerals refer to like matter throughout, and more specifically to FIG. 1, there is shown energy efficient HMA plant 1000 which can be generally constructed of the same types of materials and in the same general manner as prior art HMA plants. Energy efficient HMA plant 1000 is shown as including a drive-over truck dump 10, or the like, which can be used for receiving virgin aggregates from trucks or end loaders, etc. Note: throughout this description, virgin aggregate products are mentioned as HMA components which benefit from preheating. It should be understood that virgin aggregate is used as an example, and the present invention is intended to cover recycled or reclaimed aggregate material and any other non-RAP dry bulk component of HMA. Although this invention is described as related to HMA, it should be understood that it could be used with warm mix asphalt, etc. Drive-over truck dump 10 feeds the virgin aggregate material onto bin supplying conveyor 20 which may be an inclined conveyor carrying virgin aggregate material to the top of virgin aggregate feed bins 40. Reversing translating conveyor 30 can move virgin aggregate material either left or right to feed the various virgin aggregate feed bins 40. Aggregate feed bins 40 can be from a small size to very large, on the order of approximately 10 tons to a thousand ton or more capacity.

Virgin aggregate feed bins 40 can be circular, rectangular or other shapes. Virgin aggregate feed bins 40 are designed so that heated air can enter from the bottom and pass through the virgin aggregate material therein and heat and dry the virgin aggregate material. Depending on the moisture content of the virgin aggregate material and the humidity, either ambient air or heated air is moved through the virgin aggregate material. Virgin aggregate feed bins 40, as well as every other portion of the present invention that contains or carries heated matter, could be thermally insulated.

Gathering conveyor 50 is disposed below virgin aggregate feed bin 40 (more clearly shown in FIGS. 2 and 3). Also, see discussion of FIGS. 2 and 3 below. The heated and dried virgin aggregate material is delivered by gathering conveyor 50 to vibrating screen 60 which may be a single or multi-deck screen which removes oversize or foreign objects from the supply of virgin aggregate material. Grizzly bars, trommels and other material sorting devices could be used with or instead of vibrating screen 60.

Once the virgin aggregate material is processed, it is supplied on weigh conveyor 70 which weighs the virgin aggregate material as it is delivered to slinger 80, other high speed conveyor or feed slide chute which propels or provides the virgin aggregate material into the virgin aggregate material intake end of drum dryer/mixer 90. (While no electronic data or control lines are shown connecting the various components of the present invention, it should be understood that various wired or wireless connections may be preferred in some applications.) A counter-flow mixer is shown, but a parallel flow mixer or suitable substitute could be used as well. Discharge and burner housing 100 is shown disposed over the HMA discharge end of drum dryer/mixer 90. Burner head 110 is shown, with phantom lines, centrally disposed inside drum dryer/mixer 90 as is commonly done with prior art counter-flow mixers. RAP entry collar 120 is shown in a similar manner. Dust return auger system 130 is shown in a typical manner.

Drum heat collecting hood 140 is disposed over the heating and drying portion of drum dryer/mixer 90 as well as the mixing portion. A single or multiple heat collecting hoods could be used. Drum heat collecting hood outlet duct 150 is shown as the sole, non-exhaust, heated air removing duct from drum dryer/mixer 90. The drum heat collecting hood outlet duct 150 and the hood itself are incidentally heated. The term "incidentally heated" should be understood to mean that the hood receives heat as the result of a process other than intentionally heating the hood for pre-drying and pre-heating aggregate material before it is introduced into a mixer. Here the drum heat collecting hood outlet duct 150 and hood are indirectly and incidentally heated as a result of the burner head 110 within the drum dryer/mixer 90 in its normal operation of creating HMA. Due to low pressure, the heated air is sucked from drum heat collecting hood outlet duct 150 to valve ducting 380.

Drum dryer/mixer exhaust gas hood and ducting 160 removes the heated exhaust fumes of drum dryer/mixer 90 and provides it to course collector 170, which removes the courser portion of the airborne or air-blown fines and dust suspended or otherwise combined within the gaseous exhaust.

Course collector 170 is coupled directly to filterhouse 180 and coupled back to drum dryer/mixer 90 via dust return auger system 130. Filterhouse 180, also known as a baghouse, filters dust and finer matter from the exhaust airstream exiting course collector 170. Course collector and filterhouse heat collecting hood 190 is disposed over both course collector 170 and filterhouse 180, and it collects heat which otherwise would be lost to the atmosphere. Collector or collector hood 200 gathers the heated air from course collector and filterhouse heat collecting hood 190 and combines it with the heated air from drum heat collecting hood outlet duct 150 via a tee (shown symbolically as a mere line abutting another line) in drum heat collecting hood to valve ducting 380. Duct dampers allow the heated air from course collector and filterhouse heat collecting hood 190 and drum heat collecting hood outlet duct 150 to be balanced.

The recycled asphalt products (RAP) enter the system via RAP feed bin 210 which is coupled to vibrating screen 220 and RAP weigh conveyor 230 which weighs the RAP to be provided into RAP pre-heater/dryer 240 which could be similar to a RAP pre-heater as described in co-pending U.S. patent application having Ser. No. 12/138,204 filed by the same inventor and assigned to the same assignee, which application was published on Dec. 18, 2008 with number US-2008-0310249-A1, which is incorporated herein in its entirety by this reference. RAP pre-heater/dryer 240 heats and dries the RAP and provides the same on pre-heated RAP supplying conveyor into RAP entry collar 120. RAP dryer exhaust stack 420 is also shown.

Drum dryer/mixer 90 outputs HMA on HMA outputting conveyor 260 which carries the HMA to reversing HMA transfer conveyor 270 (similar in operation to reversing translating conveyor 30, but with appropriate changes owing to the temperature and consistency of HMA) to HMA storage silos 280, which may be disposed over top of a scale 290 for weighing trucks being loaded with the HMA.

It should be noted that not all aspects of a typical counter-flow HMA mixer are shown, such as the asphalt cement storage and metered delivery apparatus, as well as other heating means, etc. This description assumes the use of typical prior art systems and methods unless alternate ways are suggested.

Plant control house 300 is shown disposed centrally and without physical connection to the various segments of the overall system. Of course, both wired and/or wireless systems and components could be utilized. Power for each component of the present system could be provided via a power plant at each major unit or one or more power plants or electric generators which distribute power or electricity to the various system components.

First exhaust fan 310 draws or sucks air through the drum dryer/mixer 90, course collector 170, filterhouse 180 and pushes or blows air into heat exchanger 390 and RAP pre-heater/dryer 240. First balancing valve 320 could be used to balance airflow between heat exchanger 390 and RAP pre-heater/dryer 240 or shut off flow via first fan to RAP dryer duct 340.

Valve 350 can send dry pre-heated air to RAP pre-heater/dryer 240 instead of or in combination with air from first exhaust fan 310. Valve to RAP dryer duct 360 carries hot dry air to RAP pre-heater/dryer 240. Second exhaust fan 370 pulls or sucks air from drum heat collecting hood 140, course collector and filterhouse heat collecting hood 190, generator 440 and possibly from other sources of heat which are not mentioned or shown and also pushes or blows air into heat exchanger 390 where the air is further heated by exhaust air coming from first exhaust fan 310. This heated dry air is then blown into virgin aggregate drying distribution duct 400 that distributes air to any and all of the virgin aggregate feed bins 40 and to the RAP pre-heater/dryer 240.

Drum heat collecting hood to valve ducting 380 is the duct from the drum dryer/mixer 90 and its drum heat collecting hood 140 to second exhaust fan 370. A balancing valve could be used at the inlet of second exhaust fan 370 to balance airflows from drum heat collecting hood to valve ducting 380 and generator to second exhaust fan heat carrying duct 430 as they enter second exhaust fan 370.

Heat exchanger 390 takes heat from the airstream coming from the filterhouse 180 through first fan to heat exchanger duct 330. This air, besides being hot (which normally may be between 212 degrees F. to 400 degrees F.) also contains high level of moisture. This moisture when cooled in the heat exchanger condenses and gives up a large amount of heat energy. Heat exchanger 390 will have a water drain. The sensible heat and the condensation heat given up by this airstream is transferred to air from second exhaust fan 370 in heat exchanger 390. This heated dry air is sent or blown to and through virgin aggregate drying distribution duct 400 to heat and dry the virgin aggregate material or sent to the RAP pre-heater/dryer 240. Additional fans could be deployed to increase the velocity of air which is blown through virgin aggregate drying distribution duct 400.

It should be noted that second exhaust fan 370 could be left running when the rest of the plant is off for hours or days. This will use the heat in the thermal mass of the drum dryer/mixer 90, course collector 170, and course collector and filterhouse heat collecting hood 190 to continue to dry the virgin aggregate material in virgin aggregate feed bins 40. Even after such items have cooled, ambient air alone will continue to remove surface and internal moisture from virgin aggregate material.

Virgin aggregate drying distribution duct 400 can have on/off and balancing valves to control where and how much air goes to each virgin aggregate feed bin 40.

Also shown are heat exchanger exhaust stack 410 and RAP dryer exhaust stack 420.

Generator to second exhaust fan heat carrying duct 430 carries wasted heat from the generator 440 to the second exhaust fan 370. This heat can be from any source of heat associated with the generator 440. In some embodiments, no generator 440 will be used as power lines are used to provide electricity from a utility.

Figure 2:
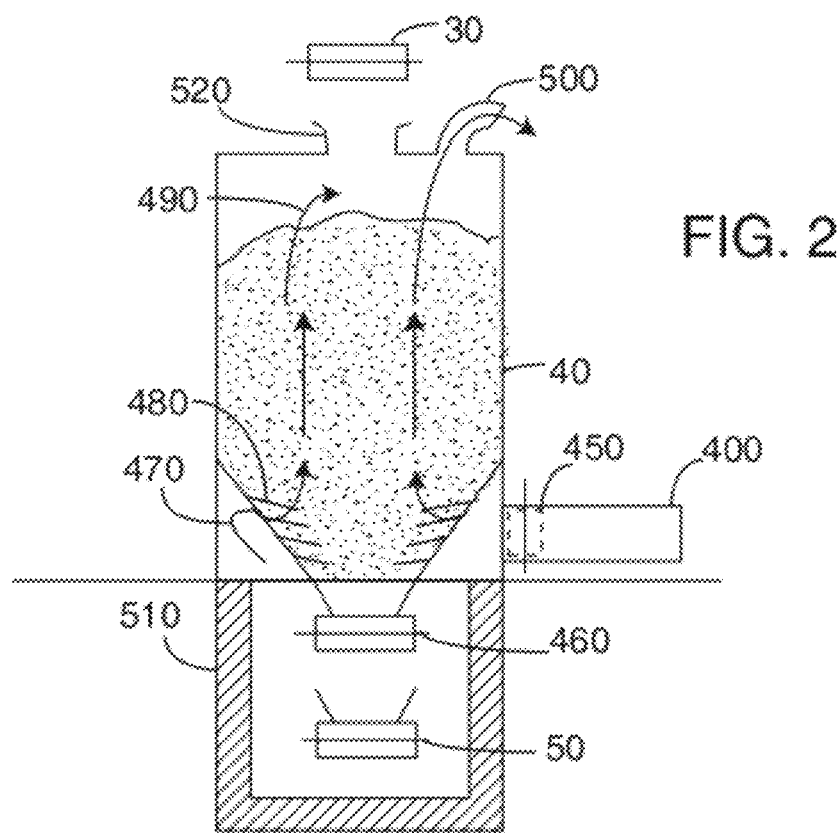
FIG. 2 is a cross-sectional view of the virgin aggregate feeder bin with integrated heater/dryer unit of the present invention taken on line A-A of FIG. 1. The solid arrows represent airflow.
Figure 3:
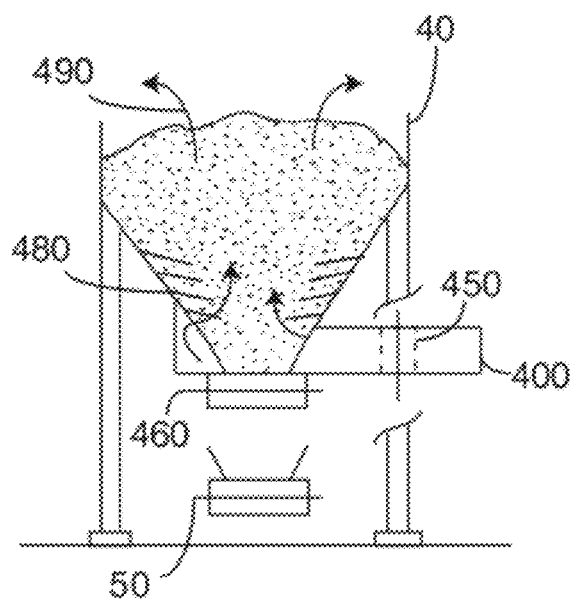
FIG. 3 is a cross-sectional view of an alternate embodiment of a virgin aggregate feed bin with integrated heater/dryer unit of the present invention taken on line A-A of FIG. 1. The solid arrows represent airflow.

Now referring to FIGS. 2 and 3, there is shown a distribution duct to feed bin metering valve 450 for controlling airflow to each virgin aggregate feed bin 40. Below the virgin aggregate feed bin 40 is virgin aggregate feeder unit 460 which is used to control the rate of flow of material onto gathering conveyor 50.

Heated airflow path 470 represent typical paths of heated air through the virgin aggregate material during the heating and drying process. Airflow permitting internal bin virgin aggregate barrier 480 forms the bottom and/or portions of the internal virgin aggregate material containing walls of virgin aggregate feed bin 40. Airflow permitting internal bin virgin aggregate barrier 480 may be passageways or specially designed baffles, etc. which permit air to flow therethrough while containing the virgin aggregate material.

Post virgin aggregate airflow path 490 represents a typical airflow path of air carrying moisture after it has passed through the virgin aggregate material. This air passes through weatherproof bin vent 500.

Below virgin aggregate feed bin 40 is access tunnel 510 which could be concrete or other suitable material. Deployable rain cover 520 is also shown atop of virgin aggregate feed bin 40 which can be opened when virgin aggregate material is being moved into the virgin aggregate feed bin 40 and closed at other times to prevent rain, snow, animals, etc. from entering the virgin aggregate feed bin 40.

Virgin aggregate feed bin 40 could include therein one or more augers for the purpose of mixing the virgin aggregate material disposed therein so as to improve drying and uniformity of the drying of the virgin aggregate material.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. An asphalt plant comprising:
    an asphalt mixer;
    a supply of aggregate material;
    a structure constructed for enclosing and containing aggregate material and protecting said aggregate material from precipitation and further comprising components configured to allow air to flow through the aggregate material for the purpose of drying said aggregate material with at least one of atmospheric air and artificially heated and propelled atmospheric air;
    a conveyor to move said aggregate material from said structure into said asphalt mixer;
    wherein said structure is configured to permit air to pass through a substantially stationary arrangement of said aggregate irrespective of the operation state of said asphalt mixer;
    wherein said artificially heated and propelled air is incidentally heated via heat generated, for purposes other than just pre-heating aggregate, during operation of said asphalt mixer and captured from surfaces of said asphalt mixer; and
    further comprising a heat exchanger which captures heat from moist exhaust fumes of said asphalt mixer and further heats air which is more dry and is moved into said structure and through said substantially stationary aggregate arrangement of aggregate material.

2. The asphalt plant of claim 1 wherein said air which is more dry is collected from heated surfaces on one of a generator, a recycled asphalt product (RAP) pre-heater and a filterhouse.

3. An asphalt plant comprising:
    an asphalt mixer;
    a supply of aggregate material;
    a structure constructed for enclosing and containing aggregate material and protecting said aggregate material from precipitation and further comprising components configured to allow air to flow through the aggregate material for the purpose of drying said aggregate material with at least one of atmospheric air and artificially heated and propelled atmospheric air;

a conveyor to move said aggregate material from said structure into said asphalt mixer;

wherein said structure is configured for drying said aggregate material with both atmospheric air and artificially heated and propelled air;

wherein said structure is configured to permit air to pass through a substantially stationary arrangement of said aggregate irrespective of the operation state of said asphalt mixer;

wherein said artificially heated and propelled air is incidentally heated via heat generated, for purposes other than just pre-heating aggregate, during operation of said asphalt mixer and captured from surfaces of said asphalt mixer;

a heat exchanger which captures heat from moist exhaust fumes of said asphalt mixer and further heats air which is more dry and is moved into said structure and through said substantially stationary aggregate arrangement of aggregate material; and wherein said air which is more dry is collected from heated surfaces on one of a generator, a recycled asphalt product (RAP) pre-heater and a filterhouse.

* * * * *